United States Patent [19]

Sugimura

[11] Patent Number: 4,784,182

[45] Date of Patent: Nov. 15, 1988

[54] BLADDER TYPE ACCUMULATOR ASSOCIATED WITH A SENSOR

[76] Inventor: Nobuyuki Sugimura, 308, Mabase, Shimizu-shi, Shizuoka-ken, Japan

[21] Appl. No.: 104,507

[22] Filed: Oct. 5, 1987

[51] Int. Cl.[4] .................................... F16L 55/02

[52] U.S. Cl. .................................... 138/30; 138/104; 73/40; 73/304 C

[58] Field of Search .................... 138/26, 30, 104; 220/85 B; 137/593, 207; 73/304 C, 40; 200/83 L

[56] References Cited

U.S. PATENT DOCUMENTS

| | | | |
|---|---|---|---|
| 3,654,956 | 4/1972 | Tsubouchi | 138/30 X |
| 3,741,692 | 6/1973 | Rupp | 138/31 X |
| 3,862,646 | 1/1975 | Tarsha | 138/30 |
| 3,929,163 | 12/1975 | Schon | 138/30 |
| 4,014,213 | 3/1977 | Parquet | 138/30 X |
| 4,088,154 | 5/1978 | Patton et al. | 138/30 |
| 4,207,563 | 6/1980 | Soupal | 138/31 |
| 4,487,226 | 12/1984 | Chun | 73/304 C |
| 4,714,093 | 12/1987 | Kawano | 138/30 |

FOREIGN PATENT DOCUMENTS 60-192945 12/1985 Japan .

*Primary Examiner*—James E. Bryant, III
*Attorney, Agent, or Firm*—Wood, Dalton, Phillips, Mason & Rowe

[57] ABSTRACT

A bladder is disposed coaxially within a cylindrical container main body, a holder projecting into the bladder is provided on a top wall plate of the container main body, a sensor opposed to a bottom portion of the bladder and positioned within a moving locus region of the bottom portion or a deformable portion of the bladder is disposed at the bottom portion of the holder, and thereby, when the bladder deforms in response to variation of a liquid pressure the bottom portion of the bladder or the deformable portion of the bladder would actuate the sensor.

7 Claims, 8 Drawing Sheets

BLADDER TYPE ACCUMULATOR ASSOCIATED WITH A SENSOR

BACKGROUND OF THE INVENTION:

The present invention relates to an accumulator that is available for storage of pressurized liquid, shock absorption or the like.

In a bladder type accumulator, an inner space of a container main body is partitioned by a bladder into a gas chamber and a liquid chamber, and liquid is made to flow into or from the liquid chamber as opposed to a gas pressure in the gas chamber.

However, if a liquid pressure in the liquid chamber should exceed an allowable limit, or if the gas pressure should be lowered due to leakage of the gas in the gas chamber, then liquid exceeding a predetermined volume would enter the container main body, hence the bladder would be contracted exceeding an allowable compression range, and eventually the bladder would be pushed into a gas feed port of the gas chamber or the like and would be damaged.

Therefore, in order to prevent such accidents, bladder type accumulators associated with a sensor as referred to in the following have been employed. For instance, a bladder type accumulator associated with the so-called shutter type sensor, in which a holder projecting into a bladder and both leg end portions of a U-shaped optical fiber accommodated in the holder are fixedly secured to a top, wall plate of a container main body, a shutter is provided in the midway of the optical fiber, and a driver for that shutter is disposed one set on the outer periphery of the holder as disclosed in Japanese Utility Model Application No. 60-192945 (1985), and a bladder type accumulator associated with the so-called umbrella type sensor, in which a holder projecting into a bladder is provided on a top wall plate of a container main body, a lower limit sensor of umbrella shape is provided at the bottom end portion of the holder, and an upper limit sensor of umbrella shape is provided above the lower limit sensor as disclosed in Japanese Utility Model Application No. 60-192944(1985), have been employed in the prior art.

A bladder in a bladder type accumulator would deform while it is subjected to a gas pressure and a liquid pressure, and the deformation has such nature that in the initial step of the deformation a bottom portion of the bladder rises in the axial direction, and in the next step of the deformation a deforming portion of the bladder contracts in the radial directions.

However, during this contraction in the radial directions, the deformable portion of the bladder would not always be deformed symmetrically along a circumference. Therefore, in some cases, a deformable portion on one side may approach the outer circumference of the holder earlier than a deformable portion on another side. In the case of the bladder type accumulator associated with the shutter type sensor in the prior art, since the shutter driver is provided only on one side of the deformable portion of the bladder, when the deformable portion of the bladder approaches the outer circumference of the holder uniformly as described above, sometimes the deformable portion of the bladder would not push the shutter driver even if the deformation of the bladder reaches its allowable compression limit.

Moreover, since the bladder would deform in the above-described manner, in the case of the bladder type accumulator associated with the umbrella type sensor in the prior art, the lower limit sensor operates only when the deformable portion of the bladder has deformed in the radial directions, and accordingly, the initial step of deformation of the bladder, that is, the step of the bottom portion of the bladder rising in the axial direction cannot be detected.

Accordingly, it is impossible to finely control the lower limit of the allowable compression range, that is, the maximum available range of the bladder.

SUMMARY OF THE INVENTION

It is therefore one object of the present invention is to provide a bladder type accumulator associated with a sensor, in which an allowable compression range of a bladder, damage of a bladder, or reduction of a filled gas pressure during operation can be surely detected.

Another object of the present invention is to provide a bladder type accumulator associated with a sensor, in which a scope of allowable compression range of a bladder can be finely controlled.

According to one feature of the present invention, there is provided a bladder type accumulator associated with a sensor comprising a top wall plate provided at the top of a cylindrical container main body, a bladder disposed coaxially in an inner space of the container main body, a holder having its top end portion fixedly secured to the top wall plate and projecting into an inner space of the bladder, and a sensor disposed at the bottom end portion of the holder as opposed to a bottom portion of the bladder so as to be positioned within a moving locus region of a deformable portion of the bladder or a bottom portion of the bladder.

According to the present invention, since the bladder type accumulator associated with a sensor is constructed in the above-described manner, in operation, when a hydraulic pressure in a hydraulic circuit is changed and hence the bladder deforms, the sensor can be surely pushed and actuated by movement in the axial direction of the bladder bottom portion or movement in the radial direction of the bladder deformable portion.

The above-mentioned and other objects, features and advantages of the present invention will become more apparent by reference to the following description of preferred embodiments of the invention taken in conjunction with the accompanying drawings.

BRIEF DESCRIPTION OF THE DRAWINGS

In the accompanying drawings

FIG. 1 is a longitudinal cross-section view of the entire assembly;

FIGS. 2 and 3 are enlarged longitudinal cross-section views of a sensor shown in FIG. 1, FIG. 2 showing the state where a shutter valve is opened, and FIG. 3 showing the state where a shutter valve is closed;

FIGS. 4 and 5 are transverse cross-section views of a bladder shown in FIG. 1, FIG. 4 showing the deformed condition in the initial step, and FIG. 5 showing the deformed condition at the allowable compression limit;

DESCRIPTION OF THE PREFERRED EMBODIMENTS

Figure 1:
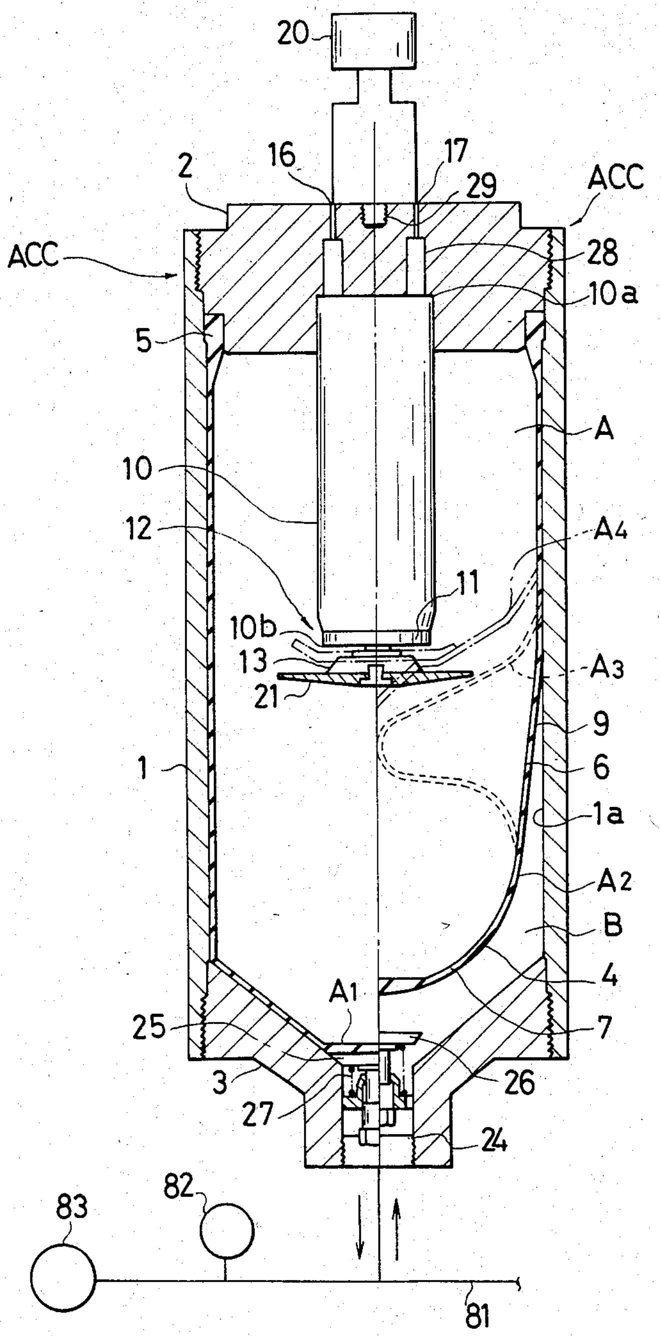
FIGS. 1 through 5, as a whole, indicate one preferred embodiment of the present invention.

Now one preferred embodiment of the present invention will be described with reference to the accompanying drawings, in which members denoted by like reference numerals have the same names and the same functions.

A container main body 1 is formed of rigid material such as metal, and its opposite ends are covered by a top wall plate 2 and a bottom wall plate 3. The inner space of the container main body 1 is partitioned into a gas chamber A and a liquid chamber B by a bladder 4 disposed coaxially with the container main body 1. This bladder 4 is made of soft elastic material such as rubber, and it is formed of a flange portion 5, a drum portion 6 and a bladder bottom portion 7. The flange portion 5 is fixedly secured to the container main body 1 as pinched between a top portion of the container main body 1 and the top wall plate 2. The drum portion 6 consists of thickwalled column-like portions 8 directed in the axial direction and thin-walled deformable portions 9 therebetween (See FIGS. 4 and 5). The bladder bottom portion 7 is also formed thick, and this bladder bottom portion 7 and the above-mentioned column-like portions 8 are formed to take the states shown in FIGS. 1, 4, 5 and 8 when the bladder has contracted from its original configuration.

To the top wall plate 2 is fixedly secured a top end portion **10*a* of a cylindrical holder 10 projecting into the bladder, and its bottom end portion 10*b* is opposed to the bladder bottom portion 7**.

Figure 2:
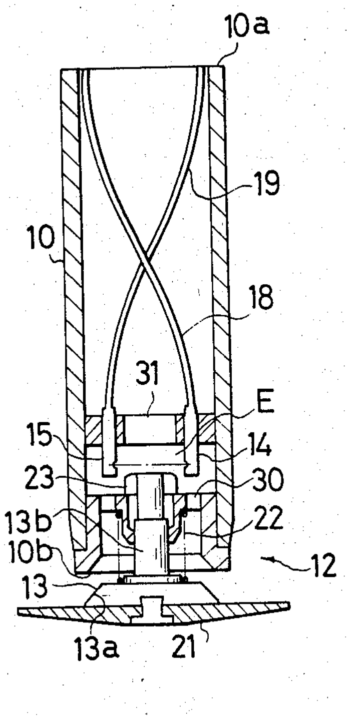
Figure 3:
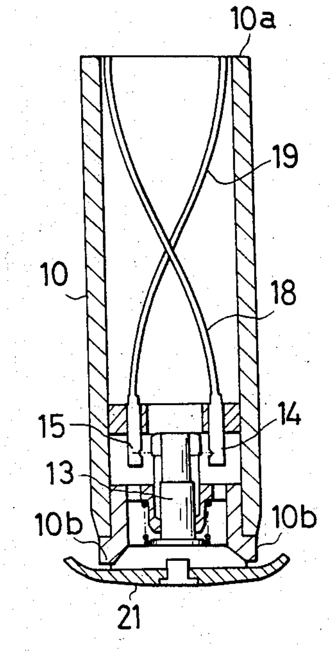

At the bottom end portion **10*b* of the holder 10 is provided a sensor 12. As shown in FIGS. 1 to 3, this sensor 12. Comprises a shutter valve 13 that is coaxial with the container main body 1, optical fibers 18 and 19 for connecting side beam attachments 14 and 15 opposed to each other via a shutter space E to a light emitting port 16 and a light receiving port 17, respectively, and a photo-electric switch 20 connected to the light emitting port 16 and the light receiving port 17**.

Over a valve portion **13*a* of the shutter valve 13 is superposed a protector 21 made of elastic material for preventing damage of the bladder 4. The shutter valve 13 is depressed downwards, that is, towards the bladder bottom portion 7 by means of a spring 22, but the downward stroke of the shutter valve 13 is restrained by a stopper 23 provided at the top of a shaft portion 13*b* of the shutter valve 13**.

In the bottom wall plate 3 is provided an inlet/outlet port 24 of liquid, and this inlet/outlet port 24 is opened or closed by means of a valve 25. It is to be noted that in the illustrated structure, reference numeral 26 designates a valve body, numeral 27 designates a spring, numeral 28 designates a fiber adapter, numeral 29 designates a charging/discharging port of gas, numerals 30 and 31 designate passageways of gas, and arrows indicate directions of flow of liquid.

When gas is injected through the charging/discharging port 29, the gas passes through the passageways 30 and 31 in the holder 10, then enters the gas chamber A, and inflates the bladder 4. This bladder 4 comes into tight contact with an inner wall surface **1*a* of the container main body 1, and also the bladder bottom portion 7 presses the valve body 26 downwards to close the valve 25. This gas is injected until the inner space of the bladder 4** becomes a predetermined pressure.

Subsequently, if a pump 83 is actuated and thereby liquid in a tank (not shown) is forcibly injected, the bladder 4 rises in the axial direction due to a difference between the gas pressure and the liquid pressure. When the bladder bottom portion 7 has risen up to a predetermined position, the bladder 4 takes its natural shape as shown at A2 in FIG. 1, and it does not rise further in the axial direction.

Figure 4:
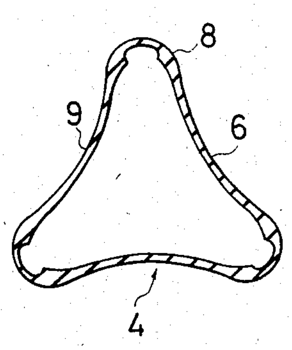
Figure 5:
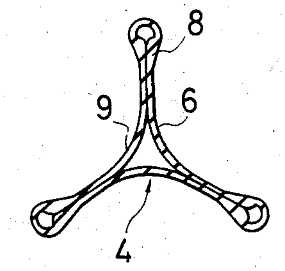

If the liquid pressure rises further, the bladder 4 would deform in the radial direction, so that its transverse cross-section configuration becomes a star shape as shown in FIG. 4, and eventually, the deformable portions 9 opposed to each other would come into contact with each other.

In accordance with this deformation, the deformable portions 9 would change from the state shown at A3 in FIG. 1 to the state shown at A4. The state shown at A3 in FIG. 1 is a state falling within an allowable compression range or within a preset liquid amount, where the shutter valve 13 maintains an open state as shown in FIG. 2 because the deformable portions 9 do not come into contact with the protector 21.

Accordingly, at this time point, since the shutter space E is opened, light emitted from the light emitting port 16 passes through the optical fiber 18 and the side beam attachment 14, then entires into the side beam attachment 15 and the optical fiber 19, and is received by the light receiving port 17, and therefore, the photo electric switch 20 does not operate.

The state of the bladder 4 shown at A4 in FIG. 1 is a state where the gas in the gas chamber A has leaked out as by penetration and hence the bladder 4 has exceeded its allowable compression range, and under this state, since the protector 21 is pushed up in the axial direction, the shutter valve 13 takes a closed state as shown in FIG. 3. Accordingly, at this time point, since the shutter space E is closed (i.e. blocked), the light emitted from the light emitting port 16 is intercepted by the shutter valve 13 and cannot reach the light receiving port 17, hence the photo-electric switch 20 operates, and it alarms that the deformation of the bladder 4 has reached the alllowable compression limit.

Also, upon damage of the bladder, the liquid enters the gas chamber A and the shutter space E is closed by the liquid, so that the switch 20 operates. It is to be noted that when the liquid does not enter the gas chamber A even if the bladder is damaged, the bladder 4 would deform in excess of the allowable compression range due to lowering of the gas pressure, hence the shutter valve 13 is closed and the photo-electric switch 20 maintains an operated state, so that damage of the bladder 4 can be discovered.

Or else, modification could be made such that a sensing point of the sensor 12 is preset within an available operation pressure range of the accumulator ACC, hence a pressure switch 82 provided in a hydraulic circuit 81 operates at a lower limit value of a hydraulic pressure before this sensor 12 operates, next the sensor 12 operate, and subsequently the pressure switch 82 operates at an upper limit value of the hydraulic pressure.

If such provision is made, when the gas pressure within the bladder 4 has been lowered, the sensor 12 would operate before a lower limit pressure switch 82 operates, while when the gas pressure has risen due to temperature rise or when the gas has been injected too much, the sensor 12 would not operate even though an upper limit pressure switch 82 has operated at the upper limit value, and therefore, increase or decrease of the gas injection pressure can be detected.

Figure 6:
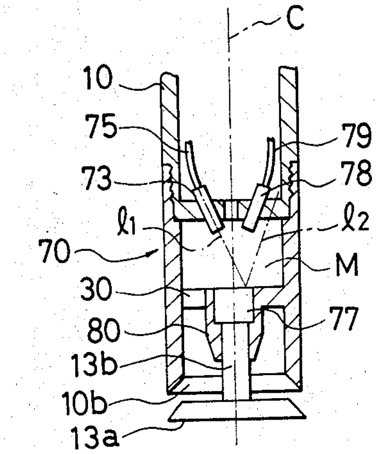
FIGS. 6 and 7 are longitudinal cross-section views showing another preferred embodiment of the present invention, FIG. 6 showing a state corresponding to FIG. 2, and FIG. 7 showing the state corresponding to FIG. 3.
Figure 7:
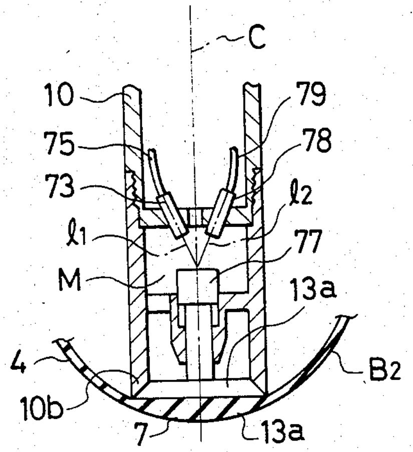

The present invention should not be limited to the above-described embodiment, but in a modified embodiment the sensor could be constructed as shown, for instance, in FIGS. 6 and 7.

In the following, description will be made on this modified embodiment. Since the construction and operation of the portions of the accumulator other than the sensor are similar to the above-described embodiment, illustration and detailed description thereof will be omitted.

The sensor is composed of a reflection table 77 that is coaxial with the container main body, lens attachments 73 and 78 which are opposed to the reflection table 77 via a reflection space M and make identical inclination angles with respect to a center axis C, optical fibers 75 and 79 for connecting these lens attachments 73 and 78 respectively to the light emitting port 16 and the light receiving port 17, and a photo-electric swith 20 connected to the light emitting port 16 and the light receiving port 17.

The reflection table 77 is provided at the top of a shaft portion **13*b* of the shutter valve 13 to irradiate light irradiated from the lens attachment 73, and a lower shoulder portion of this reflection table 77 also serves as a stopper for downward movement of the shutter valve 13. More particularly, the shutter valve 13 falls downwards, that is, towards the bladder bottom portion 7 by the action of the gravity, but when the valve portion 13*a* has fallen to a predetermined position, the falling of the shutter valve 13 is obstructed because the lower shoulder portion of the reflection table 77 butts against a support body 80**.

Light 11 issued from the photo-electric switch 20 passes through the light emitting port 16, the optical fiber 75 and the lens attachment 73 and strikes against the reflection table 77 and then it is reflected. Under the normal condition, since the valve portion **13*a* is at a lowered position as shown in FIG. 6 at this time, reflected light 12 cannot enter the lens attachment 78. Accordingly, this reflected light 2 does not reach the light receiving port 17, and hence the photo-electric switch 20** cannot operate.

Subsequently, as the liquid pressure rises and the bladder 4 deforms, the bladder bottom portion 7 would rise in the axial direction, and when the deformation reaches the lower limit of the allowable compression range of the bladder, the bladder bottom portion 7 stops movement and takes the state shown at B2 in FIG. 7. At this moment, since the bladder bottom portion 7 pushes up the valve portion **13*a*, the reflection table 77 would rise, but when the valve portion 13*a* butts against a bottom end portion 10*b* of the holder 10, the reflection table 77** stops to rise.

At this time, with respect to the center axis C of the reflection table 77, an optical axis of the light 11 and an optical axis of the light 12 become axis-symmetric. Accordingly, the reflected light 12 for the light 11 passes through the lens attachment 78, the optical fiber 78 and the light receiving port 17 and actuates the photo-electric switch 20, and thereby it is alarmed that the deformation of the bladder 4 has reached the allowable compression range.

It is to be noted that if the bladder 4 is damaged, then the liquid flows into the gas chamber A, but in the case where this liquid is transparent for the light, the photo-electric switch 20 does not operate. However, if this liquid comes into contact with the reflection table 77, the photo-electric switch 20 would operate because the reflected light 12 enters the lens attachment 78 due to refraction at the bounding between the gas and the liquid.

Figure 8:
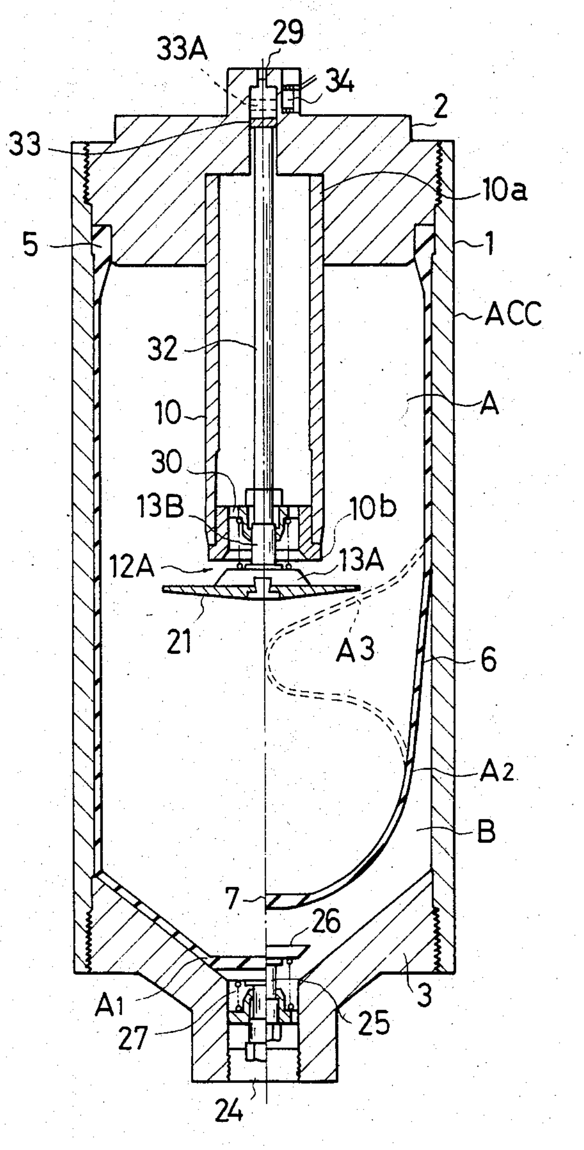
FIG. 8 is a longitudinal cross-section view showing still another preferred embodiment of the present invention.

Furthermore, the sensor could be constructed as shown in FIG. 8. That is, a rod 32 is fixedly secured to a shaft portion 138 of a slide valve 13A in a sensor 12A, an actuator 33 such as, for example, a magnet is provided at the top end of the rod 32, and a magnetic switch 34 is disposed in the vicinity of the locus of movement of that actuator 33. Then, when the slide valve 13A has been closed and the actuator 33 has moved to a position 33A indicated by dash lines, it is alarmed that deformation of the bladder has reached the allowable compression range.

Now, a still further preferred embodiment of the present invention will be described with reference to FIGS. 9 to 11. When gas is injected through a charging-/discharging port 29, the gas passes through passageways 30, 31 and 60 in a holder 10 and enters a gas chamber A, and it inflates a bladder 4. At this time, as shown at B1 in FIG. 9 the bladder 4 comes into tight contact with an inner wall surface **1*a* of a container main body 1, and a bladder bottom portion 7 presses a valve body 26 downwards to close a valve 25**. This injection of gas continues until the inner space of the bladder reaches a predetermined pressure.

Subsequently, when liquid in a tank (not shown) is forcibly injected through an inlet/outlet port 24 by actuating a pump 83, the bladder 4 would rise in the axial direction due to a difference between the gas pressure and the liquid pressure. In accordance with this rise, the bladder bottom portion 7 separates from the valve 25 and moves in the axial direction, but when the deformation of the bladder has reached the allowable compression range of the bladder, it stops to move and takes the state shown at B2 in FIG. 9.

At this time, since the bladder bottom portion 7 pushes up a protector 21 in the axial direction, a shutter valve 13 takes a closed state. Accordingly, at this time point, as a shutter space E2 is closed, light emitted from a first light emitting port 16 is intercepted by the shutter valve 13 and cannot reach a first light receiving port 17, and therefore, a lower limit photo-electric switch 20 operates and alarms that the deformation of the bladder has reached a lower-limit of the alllowable compression range of the bladder.

Also, in this case, if a pressure switch 82 in a hydraulic circuit 81 is preset at a pressure lower than the pressure at which the photo-electric switch 20 operates, then when the gas in the bladder has leaked out, the gas pressure is lowered, so that the photo-electric switch would operate before the pressure switch 82 operates. Accordingly, a system that can alarm that the injected gas pressure in the bladder 4 has become lower than a predetermined value can be manufactured, and hence, such arrangement is useful for checking an injected gas pressure upon starting of operation.

If the liquid pressure increases further, then the bladder 4 deforms in the radial directions, a cross-section configuration of the bladder 4 becomes star shape as shown in FIG. 4, and eventually, deformable portions 9 opposed to each other would come into contact with each other. In accordance with this deformation, the deformable portion 9 would change from the state shown at B3 to the state shown at B4 in FIG. 10.

Figure 9:
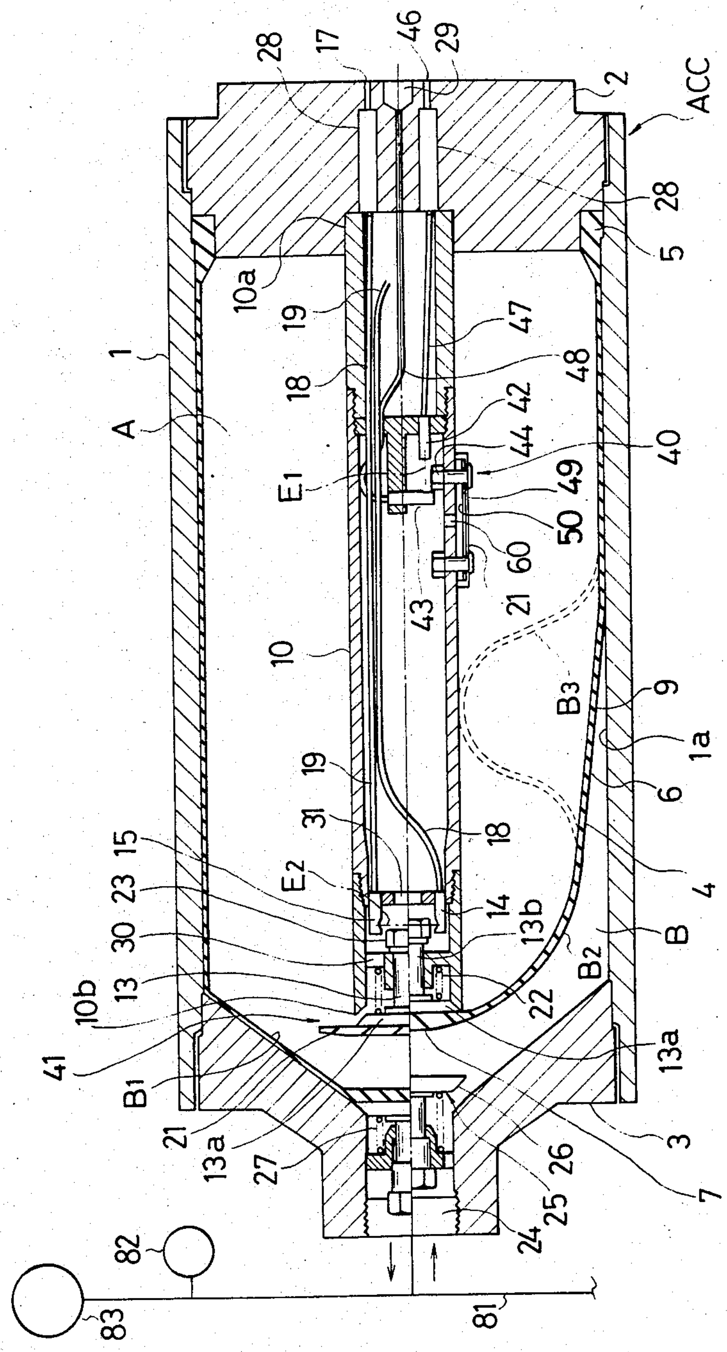
FIG. 9 is a longitudinal cross-section view showing yet another preferred embodiment of the present invention.

The state shown at B3 is a state falling within the allowable compression range, where the deformable portion 9 does not press a drive portion 49, and so, a shutter 44 maintain an open state as shown in FIG. 9. Accordingly, at this time point, as a shutter space E1 is opened, light emitted from a second light emitting port 45 passes through an optical fiber 47 and a side beam attachment 42, then enters a lens attachment 43 and an optical fiber 48, and is received by a second light receiving port 46, and therefore, an upper limit photo-electric switch 51 (See FIG. 11) would not operate.

Figure 10:
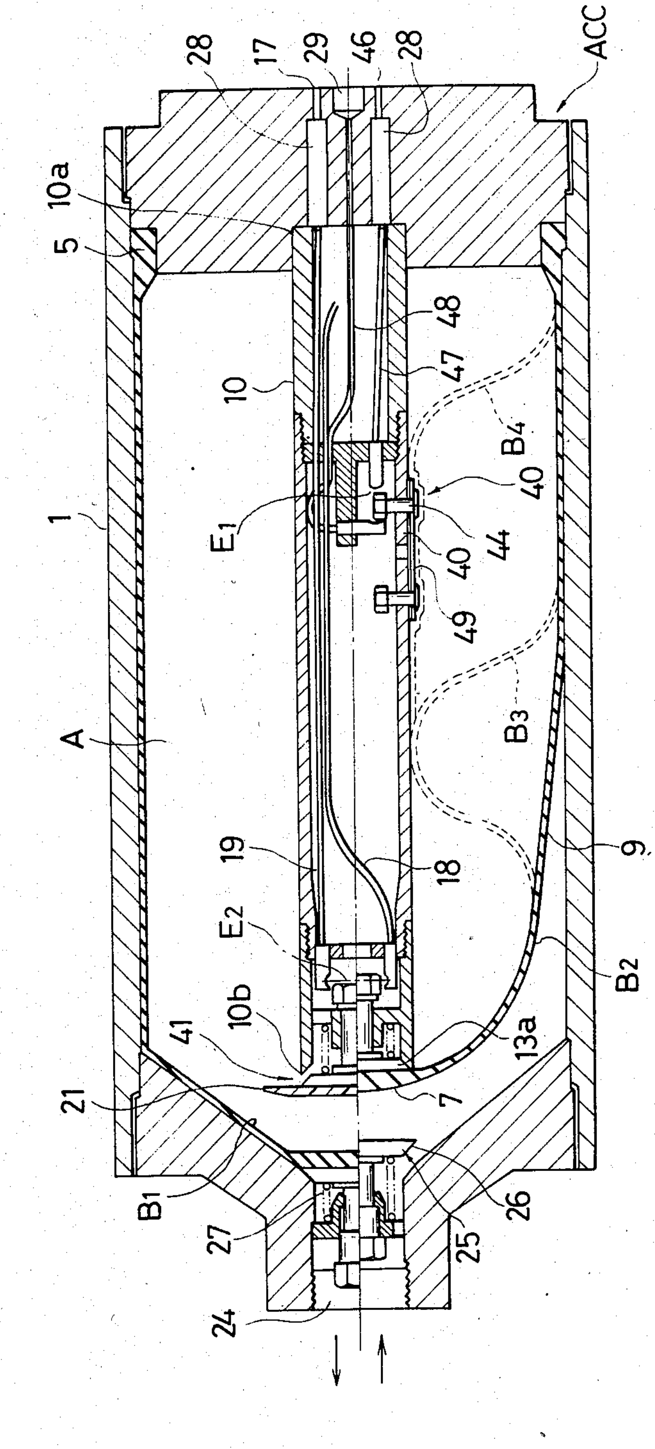
FIG. 10 is a longitudinal cross-section view showing a different state of the embodiment shown in FIG. 9.
Figure 11:
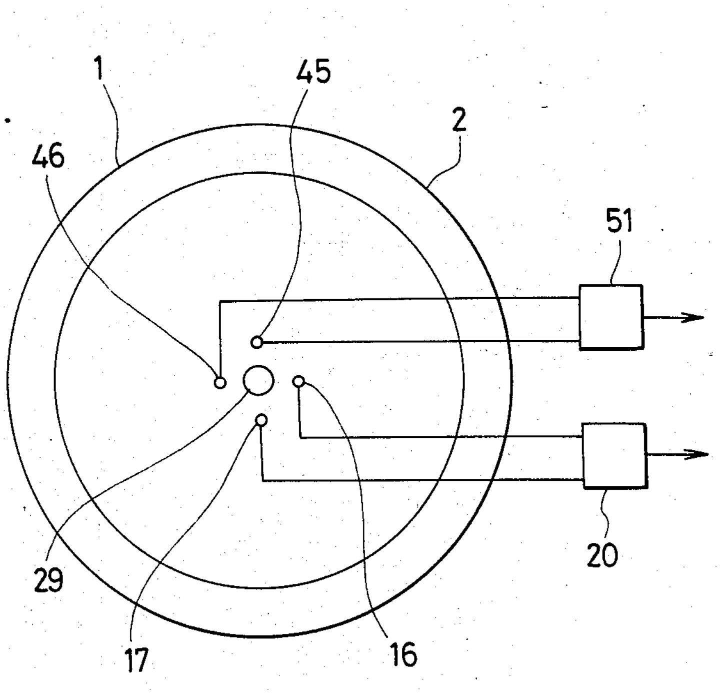
FIG. 11 is a schematic end view of the embodiment shown in FIGS. 9 and 10.

The state shown at B4 is a state exceeding an upper limit of the allowable compression range of the bladder, and under this condition, since an arcuate spring 50 in the drive portion 49 is pressed in the radial directions, the shutter 44 would take a closed state as shown in FIG. 10. Accordingly, at this time point, since the shutter space E1 is closed, light emitted from the second light emitting port 45 is intercepted by the shutter 44 and cannot reach the second light receiving port 46, and hence the upper limit switch 51 would operate and alarm that the deformation of the bladder has leached an upper limit of the allowable compression range.

If the bladder 4 is damaged, then the liquid would flow into the gas chamber A and the shutter spaces E1 and E2 are closed by the liquid, and hence the photo-electric switches 20 and 51 would operate.

Or else, in the case where the liquid does not enter the gas chamber A even though the bladder is damaged, then due to the fact that the bladder 4 deforms in excess of the allowable compression range of the bladder 4 as a result of lowering of the gas pressure, the photo-electric switches 20 and 51 would operate.

In this connection, it is a matter of course that the lower limit sensor could be constructed as shown in FIGS. 6, 7 and 8.

While the upper limit sensor is mounted at such position that the sensor may operate at the upper limit of the allowable compression range of the bladder, it could be mounted at such position that it may operate before the upper limit is attained, in other words, at a position lower than the abovementioned upper limit position and within the range where the bladder is compressed into star shape, for instance at the lowest position within the range of the star-shaped deformation.

Figure 12:
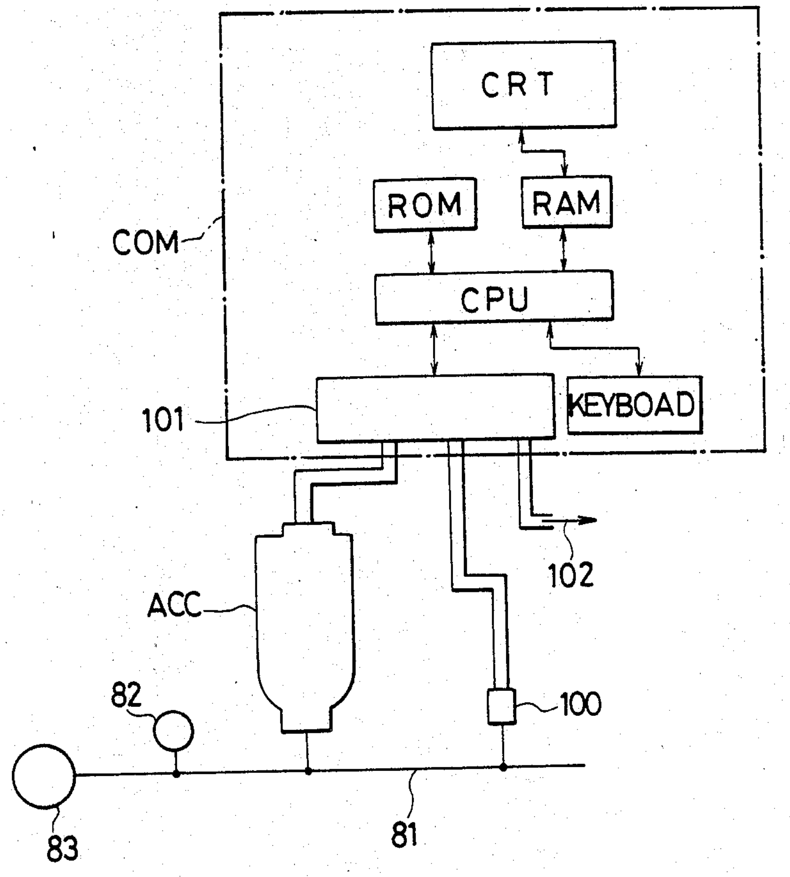
FIG. 12 is a block diagram showing an accident detection system for the accumulator according to the present invention.

In addition, in the event that any accident should arise in the accumulator ACC, it can be detected through the process illustrated in FIG. 12. More particularly, an upper limit sensor is mounted within an operation range of the accumulator, a pressure in a hydraulic circuit 81 when the upper sensor has operated is converted into a signal via a pressure transducer 100, this signal is taken into a computer COM jointly with alarm signals from the accumulator ACC via a programmable interface 101, then processed in a central processing unit CPU, and compared with a condition on a RAM in which a conditional formula for a preset pressure and a positional relationship is stored, and if the condition is not fulfilled, that is, where there is a problem, either an abnormal signal is issued from the central processing unit CPU through the programmable interface 101 to the outside 102, or the abnormal condition is displayed on a cathode-ray tube CRT from the RAM via a DMA transfer circuit.

What is claimed is:

1. A bladder type accumulator associated with a sensor, comprising a top wall plate provided at the top of a cylindrical container main body, a bladder disposed coaxially in an inner space of said container main body, an elongated holder having its top end portion fixedly secured to the top wall plate and projecting into an inner space of the bladder, and a sensor disposed within the bottom end portion of the holder including a shutter valve positioned within a moving locus region of a deformable bottom portion of the bladder, said shutter valve being slidable in an axial direction for opening or closing a shutter space in response to an axial movement of the deformable bottom portion of the bladder.

2. A bladder type accumulator associated with a sensor as claimed in claim 1, characterized in that said sensor includes a slide valve for actuating a magnetic switch.

3. A bladder type accumulator associated with a sensor as claimed in claim 1, characterized in that said sensor includes a reflection table which can slide in the axial direction.

4. The bladder type accumulator as claimed in claim 1, characterized in that said bladder includes a drum portion consisting of thick-walled column-like portions directed in the axial direction, and thin-walled deformable portions therebetween, said bladder bottom portion and said column-like portions being deformable in response to contraction of the bladder from an original configuration.

5. The bladder type accumulator as claimed in claim 1, characterized in that said bladder is a pleated bladder.

6. A bladder type accumulator associated with upper and lower sensors, in which the bladder is disclosed coaxially within a cylindrical container main body, an elongated holder projecting into the bladder is provided on a top wall plate of said container main body, and an upper limit sensor and a lower limit sensor are disposed on said holder as spaced from each other in an axial direction; characterized in that said lower limit sensor is disposed within a bottom portion of the holder and includes a shutter valve positioned within a moving locus region of a deformable bottom portion of the bladder, said shutter valve being slidable in an axial direction for opening and closing a shutter space in response to an axial movement of the deformable bottom portion of the bladder.

7. A bladder type accumulator associated with upper and lower sensors as claimed in claim 6, characterized in that said shutter valve is provided with a protector on its outside.

* * * * *